(12) United States Patent
Wu et al.

(10) Patent No.: US 7,046,999 B2
(45) Date of Patent: May 16, 2006

(54) HALF-DUPLEX WIRELESS AUDIO COMMUNICATION SYSTEM

(75) Inventors: Ka Ming Wu, Chai Wan (HK); Yan Kwan So, Causeway Bay (HK)

(73) Assignee: Nasaco Electronics (Hong Kong) Ltd., Quarry Bay (HK)

( * ) Notice: Subject to any disclaimer, the term of this patent is extended or adjusted under 35 U.S.C. 154(b) by 249 days.

(21) Appl. No.: 10/449,993

(22) Filed: May 30, 2003

(65) Prior Publication Data

US 2004/0242242 A1    Dec. 2, 2004

(51) Int. Cl.
*H04M 3/00*    (2006.01)
*H04H 5/00*    (2006.01)

(52) U.S. Cl. .......................... 455/420; 455/419; 381/2

(58) Field of Classification Search ............ 455/465.5, 455/420, 151.2, 92; 700/94; 381/311, 2
See application file for complete search history.

(56) References Cited

U.S. PATENT DOCUMENTS

| | | | | |
|---|---|---|---|---|
| 3,577,080 A * | 5/1971 | Cannalte | ...................... | 455/92 |
| 4,654,481 A * | 3/1987 | Corris et al. | ................. | 455/462 |
| 4,982,401 A * | 1/1991 | Box | ........................... | 455/462 |
| 4,991,207 A * | 2/1991 | Shiraishi et al. | ............ | 380/271 |
| 5,619,582 A | 4/1997 | Oltman et al. | ................ | 381/82 |
| 5,794,127 A | 8/1998 | Lansang | ...................... | 455/66 |
| 5,983,087 A * | 11/1999 | Milne et al. | ................. | 455/149 |
| 6,006,115 A | 12/1999 | Wingate | ...................... | 455/568 |
| 6,212,282 B1 * | 4/2001 | Mershon | ...................... | 381/77 |
| 6,289,213 B1 * | 9/2001 | Flint et al. | ................... | 455/420 |
| 6,327,476 B1 * | 12/2001 | Koscal | ........................ | 455/462 |
| 6,661,810 B1 * | 12/2003 | Skelly et al. | ................ | 370/516 |
| 2001/0009570 A1 * | 7/2001 | Knox | .......................... | 375/259 |
| 2002/0003889 A1 * | 1/2002 | Fischer | ........................ | 381/370 |
| 2002/0102949 A1 | 8/2002 | Langer | | |
| 2003/0054784 A1 * | 3/2003 | Conklin et al. | ........... | 455/151.2 |
| 2003/0223604 A1 * | 12/2003 | Nakagawa | ................... | 381/311 |
| 2003/0236583 A1 * | 12/2003 | Baumgarte et al. | ........... | 700/94 |

* cited by examiner

*Primary Examiner*—Eliseo Ramos-Feliciano
*Assistant Examiner*—Marivelisse Santiago-Cordero
(74) *Attorney, Agent, or Firm*—George O. Saile; Stephen B. Ackerman; Billy Knowles

(57) ABSTRACT

A wireless communication system that transmits content signals and remote control signals between a content retention and distribution system and a content reproduction terminal over a half-duplex channel such as an RF channel having the same frequency band. The wireless communication system includes a base station and a remote station. The base station formats and transmits the content signal over the half-duplex channel. The remote station receives the transmitted content signal and transfers the content signal to the content reproduction terminal. The content reproduction terminal has an input device to create remote control signals for the content retention and distribution system. The remote station receives the remote control signals from the content reproduction terminal and transmits the remote control signal to the base station for transfer to the content retention and distribution system on the half-duplex channel.

42 Claims, 8 Drawing Sheets

HALF-DUPLEX WIRELESS AUDIO COMMUNICATION SYSTEM

BACKGROUND OF THE INVENTION

1. Field of the Invention

This invention relates generally to systems and methods for transmitting and receiving signals such as digitized audio and control signals. More particularly, this invention relates to wireless transmission of digitized audio signals to a remote station and the transmission of remote control signals from the remote station to control the source of the audio signals. The transmission of the digitized audio signals and the remote control signals are on a half-duplex channel.

2. Description of Related Art

The wireless transmission of audio signals is well known in the art. Portable or cordless telephones transmit and receive digitized audio signals between a base station and a portable remote handset. Further, wireless headphones and wireless speakers are commonly used for audio entertainment or television systems.

In the case of the portable or cordless telephones, the system transmits from the base station on one channel or frequency and the handset or remote station transmits on a separate channel or frequency. This is commonly referred to as full duplex operation. Alternately, the wireless headphones normally do not have any transmission capability and only receive the transmissions from the audio entertainment systems. Control of audio entertainment systems often occur with a separate remote control of the type that uses infrared communications unrelated to the transmission for the headphone or speaker. In both cases, this type of communication is commonly referred to as simplex communication.

Some wired headphones for entertainment systems such as portable compact disc (CD) players have additional wiring within the headphone cabling to allow for remote control with a separate set of control switches for the CD player. The control function is attached to the wiring only and has no relationship to the headphone function.

U.S. Pat. No. 5,619,582 (Oltman, et al.) describes an audio enhancement system. Wireless headphones include a transmitter and a receiver. The receiver has a synchronization device that utilizes electromagnetic locating signals to locate the position of the receiver with respect to the transmitter.

U.S. Pat. No. 5,794,127 (Lansang) details a headphone remote control for operating an entertainment center. The headphone includes a fully equipped remote control for privately operating and controlling an entertainment center. The inventive device includes an antenna receiver, a channel selector control, a locator speaker, a locator over-ride circuit, a pressure switch, and a head phone transmitter for transmitting channel and function selection to the entertainment center.

U.S. Pat. No. 6,006,115 (Wingate) details wireless headphones for entertainment and telephonic communication. Wireless headphones receive radio frequency transmissions from a sound system to provide music and other audio programming to a user who is free to move anywhere within the range of the transmissions. The headphones may also incorporate a microphone so that the user can receive the phone call with the headphones, indicating both a transmitter and receiver present in the headphones.

U.S. Patent Application 20020102949 (Langer) describes an entertainment system remote control with an audio port. The remote control has a set of input controls to control an electronic device, including a volume control that is used for entering commands that control the electronic device. The commands are sent to the electronic device using a transmitter. The remote control includes an integral receiver capable of reproducing a digitized audio signal received from the electronic device. The audio output is presented to a port for a headphone jack. When a headphone jack is inserted into the headphone port, the remote control transmits a mute command to the electronic device. Once a headphone jack is inserted into the port, the volume control is configured to control the audio output of the remote control.

SUMMARY OF THE INVENTION

An object of this invention is to provide a wireless communication system to transmit a content signal from a content retention and distribution system to a content reproduction terminal.

Another object of this invention is to provide a wireless communication system that transmits control signals from a content reproduction terminal to a content retention and distribution system.

Further, an object of this invention is to provide a wireless communication system that transmits content signals and control signals between a content retention and distribution system and a content reproduction terminal over a half-duplex channel.

To accomplish at least one of these objects, a wireless communication system includes a base station and a remote station. To receive a fundamental content signal, the base station is in communication with a content retention and distribution system such as audio or video reproduction equipment. The content signal being an analog audio signal, a digitized audio signal, a video analog signal or a digitized video signal. The base station partitions the fundamental content signal into signal packets. Timing, identification, and control messages are then appended to the signal packets to form the content signal. The base station then transmits the content signal over a half-duplex channel. The half-duplex channel can be one of the following: an RF channel with the same frequency band for base and remote stations, an infrared light channel, an ultrasonic channel, or a wired serial communication link.

The wireless communication system includes a remote station that receives the transmitted content signal. The remote station then removes the timing, identification, and control signals from the content signal and reassembles the fundamental content signal. The remote station is in communication with the content reproduction terminal. Preferably, the content reproduction terminal is headphones or speakers for audio content, but may be a video display for reproduction of video content. The remote station transfers the reassembled content signal to the content reproduction terminal for reproduction. The content reproduction terminal has an input device that creates control signals like power on/off, volume increase, volume decrease, presentation selection, pause presentation, fast-forward presentation, rewind presentation and other programming control functions of the of the content retention and distribution system. The remote station receives the control signals from the content reproduction terminal. Timing and identification messages are appended to the control signal to form a control message that is transmitted to the base station.

When the base station receives the control message from the remote station, the base station removes the timing and identification messages and transfers the control signal to the content retention and distribution system. This provides remote control functions for the content retention and distribution system. If the timing, identification, and the control messages contain an end-of-transmission semaphore indicating that the fundamental content signal is completed and the base station is ready to receive a transmission from the remote station, the remote station transmits the control message to the base station.

If the control message from the remote station is an acknowledgment of receipt of the transmitted content signals and a ready-to-receive semaphore, the base station begins to transmit the next content signal. Alternately, if the control message contains a request to re-transmit at least one portion of the content signal, the base station retransmits the last transmitted content signal.

Rather than having an end of transmission semaphore and a ready to receive semaphore, the content signal has a first predetermined duration. At the completion of the first predetermined duration, the control message is transmitted from the remote station for a second predetermined duration, whereby transmission of the control message is synchronized with the transmission of the content signal. The control signal will either be a request to retransmit a previous block or will be control signals for the content retention and distribution system.

To form the content signal, the base station generates a content error correction code for the fundamental content signal and appends the content error correction code to the fundamental content signal. Upon receipt of the content signal, the remote station examines the content error correction code to detect and correct corruption of the content signal. If the content signal is not correctable, the remote station provides the request to re-transmit the previous block to insure proper display. The remote station includes a buffer memory that retains the content signal. This insures continuous transfer of the content signal to the content reproduction terminal even with corruption and re-transmission of portions of the content signal.

The remote station generates a control error correction code for the control signal and appends the control error correction code to the control signal in the formation of the control message. The base station examines the control error correction code to detect and correct corruption of the control message.

DETAILED DESCRIPTION OF THE INVENTION

Figure 1:
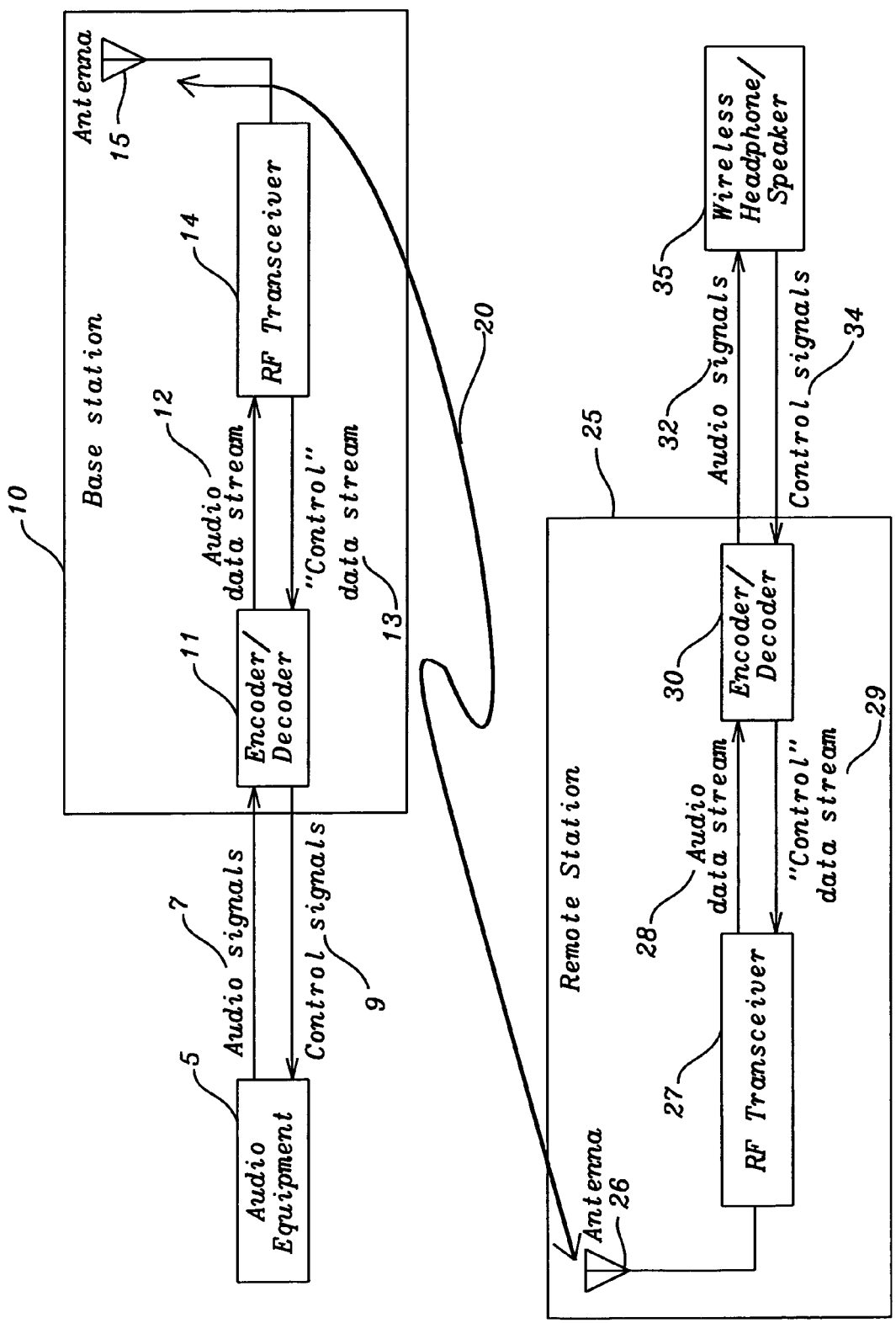
FIG. 1 is a functional block diagram of a half duplex wireless audio communication system of this invention.

The half-duplex wireless communication system of this invention has a base station attached or integrated to a content retention and distribution system. In this context, the content retention and distribution systems are compact disc players, AM/FM receivers, satellite audio and video receivers, computers, and other electronic entertainment equipment. In a preferred embodiment, analog or digitized audio signals are transferred from the content retention and distribution system to a base station. Initially, the base station converts the analog audio signals into digitized audio signals. Then the base station formats the signals into frames and blocks and generates a frame and block communication protocol to provide timing, identification, and control semaphores to the digitized audio frames. Then the base station modulates a fundamental frequency signal with the digitized audio frames for transmission.

A remote station of the half-duplex wireless communication system of this invention is attached to or integrated with remote reproduction devices like headphones or speakers. The remote station receives the transmitted signal, demodulates the signals and then extracts the digitized audio signals. The timing, identification, and control signals provide the necessary information for insuring the extraction of the digitized audio. Next, the remote station then converts the digitized audio to analog audio signal for reproduction in the headphones or speakers. The wireless transmission allows a person using the system to be at a remote distance from the content retention and distribution system, thus making a remote control function desirable for the system. To accomplish the remote control function, the remote station receives remote control commands from an input device associated with or attached to the headphones or speakers. The remote station may also have an Infra-red sensor so that it can receive signal of the remote control unit that comes with the entertainment equipment remote station. The remote control commands are formatted by the remote station. They have timing, identification, and control semaphores attached to form a remote control frame or block. The remote control frame or block is transmitted to the base station where it is received and the remote control commands are extracted. The base station transfers the remote control commands to the content retention and distribution system for execution by direct connection or through an infrared light emitting diode to the infrared receiver of the entertainment equipment.

In the preferred embodiment, the transmission of the frames and blocks of the digitized audio and the transmission of the remote control commands are separated in time by what is known as half-duplex transmission. The protocol of the half-duplex transmission determines the timing of the transmission of the blocks of the digitized audio and the remote control commands. In a first case the base station embeds an end-of-transmission within each block or group of blocks of the digitized audio signal. The remote station has a ready-to-receive command that is inherent in the remote control commands. When the base station receives the ready-to-receive command, the blocks of the digitized audio are transmitted. When the remote station receives the end-of transmission, the remote station transmits the remote control command frames.

In a second case, each block or group of blocks of digitized audio is of a fixed duration. At the completion of the duration, the base station is ready to receive the remote control command frames. The remote station generates a remote control command frame that has a fixed duration and is transmitted at the end of each transmission of the block or groups of blocks of the digitized audio. If there are no remote control commands, the remote station transmits a null signal or a ready-to-receive signal. Alternately, the remote station may actually not transmit any signal and the base station will allow the receive time to expire and begin to send the next block or blocks of the digitized audio.

Refer, now to FIG. 1 for a more detailed description of the half-duplex wireless communication system of this invention. The audio equipment 5 is a content retention and distribution system like compact disc players, AM/FM receivers, satellite audio and video receivers, computers, and other electronic entertainment equipment. The audio equipment 5 is in communication with the base station 10 to transfer the digitized or analog audio signals 7 to the base station 10 and to transfer the remote control signals 9 from the base station 10. The base station 10 may either be separated from the audio equipment 5 or integrated with the audio equipment 5 as a sub-unit or sub-system.

The audio signals 7 are the inputs to the encoder/decoder 11. If the audio signal 7 is an analog signal, the encoder/decoder 11 converts an analog audio signal to a digitized audio signal. The digitized audio signal is then formed into packets which are then collected into frames and blocks that have error detection and correction codes appended to the frames. The frames are then formed into blocks of frames. Timing, identification and control semaphores are appended to the blocks. The blocks of the digitized audio signals 12 are transferred to the RF transceiver (transmitter/receiver) 14. The blocks of the digitized audio signal 12 are used to modulate an RF fundamental frequency, which is then applied to the antenna 15 for transmission to the remote station 25 by the RF signal 20.

The antenna 26 of the remote station 25 acquires the RE signal 20 and transfers it to the RE transceiver 27. The receiver portion of the RF transceiver demodulates 27 the RE signal 20 to extract the blocks of the digitized audio signals 28. The blocks of the digitized audio signals 28 are transferred to the encoder/decoder 30. The encoder/decoder 30 extracts the timing, identification, and control semaphores and regenerates the frames of the digitized audio signals. The encoder/decoder 30 further checks for and corrects any errors that result from corruption of the RF Signal 20. The recovered and corrected digitized audio signals are then converted to analog audio signals 32 that are transferred to the headphones or speakers 35.

The headphones or speakers 40 include an input device that provides the remote control signals 34. The remote control signals 34 are transferred to the encoder/decoder 30 of the remote station 25, where they are formatted into a remote control frame. The remote control frame has an error detection and correction code appended with appropriate timing, identification, and control semaphores. The formatted remote control signal 29 is transferred from the encoder/decoder 30 to the RF transceiver 27. The formatted remote control signal 29 is used to modulate an RF fundamental frequency and the modulated RF frequency signals are applied to the antenna 26 for transmission to the antenna 15 of the base station. The fundamental frequencies of the base station 10 and the remote station 25 are identical, thus making the communication channel between the two antennas 15 and 26 a half-duplex channel.

Figures 2A, 2B:
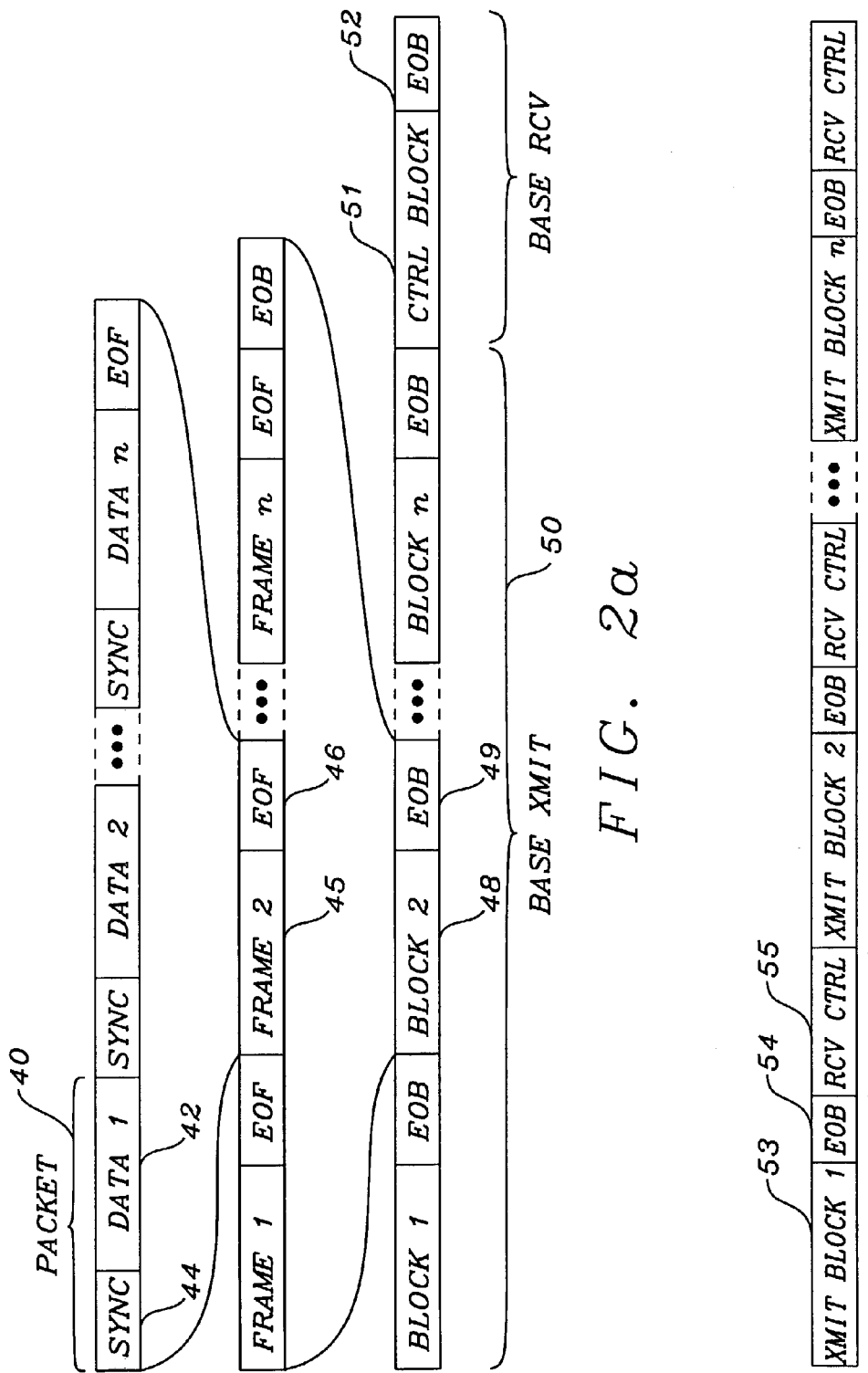
FIGS. 2a and 2b are diagrams of the structure of two embodiments of protocols of the half-duplex wireless audio communication system of this invention.

Refer now to FIGS. 2a and 2b, for a description of the frame and block formats of the digitized audio and remote control signals. Multiple samples of the audio signal are digitized and collected to form a data packet 42. A synchronization semaphore 44 is appended to each data packet 42 to provide timing information for the extraction of the digital audio signals. A group of data packets 40 with the appended synchronization semaphores 44 forms a frame 45. Each frame 45 of the data packets has an end-of-frame semaphore 46 appended to it indicating the boundary of the frame. Identification and control information maybe included in the end-of-frame semaphore 46. Depending on the structure of the frame 45 and the end-of-frame semaphore 46, the error detection and correction codes are alternately placed in the frame 45 or in the end-of-frame semaphore 46.

A group of frames 45 and the appended end-of-frame semaphore 46 are collected to form a block 48. An end-of-block semaphore 49 is attached to each block 48. The end-of block may also contain identification and control information necessary for the recovery of the digitized audio signals within each block. The identification information indicates which set of headphones or speakers is to receive the transmitted digitized audio. It is within keeping of this invention that the content retention and distribution device can effectively time-multiplex the content signals in a way that allows different headphones and speakers to reproduce different content and provide different remote control commands to various sub-units or sub-systems. The structure of this time-multiplexing is not described in detail in this invention.

In the first embodiment of the transmission of the digitized audio signal of this invention, the base station 10 of FIG. 1 transmits a fixed number of blocks 50. At the completion of the transmission of the fixed number of blocks 50, the base station 10 is set to receive a control block 51 with an appended end-of-block semaphore 52. The control block 51 contains the remote control command and the appended timing, identification, and control semaphores. The end-of-block semaphore 52 contains additional identification and control signals indicating completion of the transmission. The control block 51 and the appended end-of-block semaphore 52 are of a fixed duration. The timing of the transmission and the reception of the base station 10 and the remote station 25 are synchronized.

In a second embodiment, the timing and control information of the final block of the transmission 50 has a ready-to-receive semaphore that is transmitted by the base station 10. The remote station 25 then transmits the control block 51 with the appended end-of-block semaphore 52. If the remote station 25 has no remote control commands to transmit, the remote station 25 transmits a ready-to-receive semaphore indicating that it is now in a receive mode. Alternately, the base station 10 may send individual blocks 53 as shown in FIG. 2b. If the end-of-block semaphore 54 acts as an end-of-transmission or ready-to-receive, the base station 10 then activates the receiver and listens for a remote control signal 55 from the remote station 25. If no remote control signal 55 is detected, the base station 25 then transmits the next block of the digitized audio signal. Alternately, if there is no remote control signals to be transmitted, the remote station 25 may transmit a ready-to-receive semaphore indicating that the base station should begin transmission.

In summary, the protocol may be a "handshaking" protocol where the base station 10 and the remote station 25 each transmit a ready-to-send or a ready-to-receive message or semaphore between each communication. Alternately, the protocol may be a "synchronous" protocol where each transmission has a fixed duration and the intended receiver is "listening" during a fixed time period.

Figure 3:
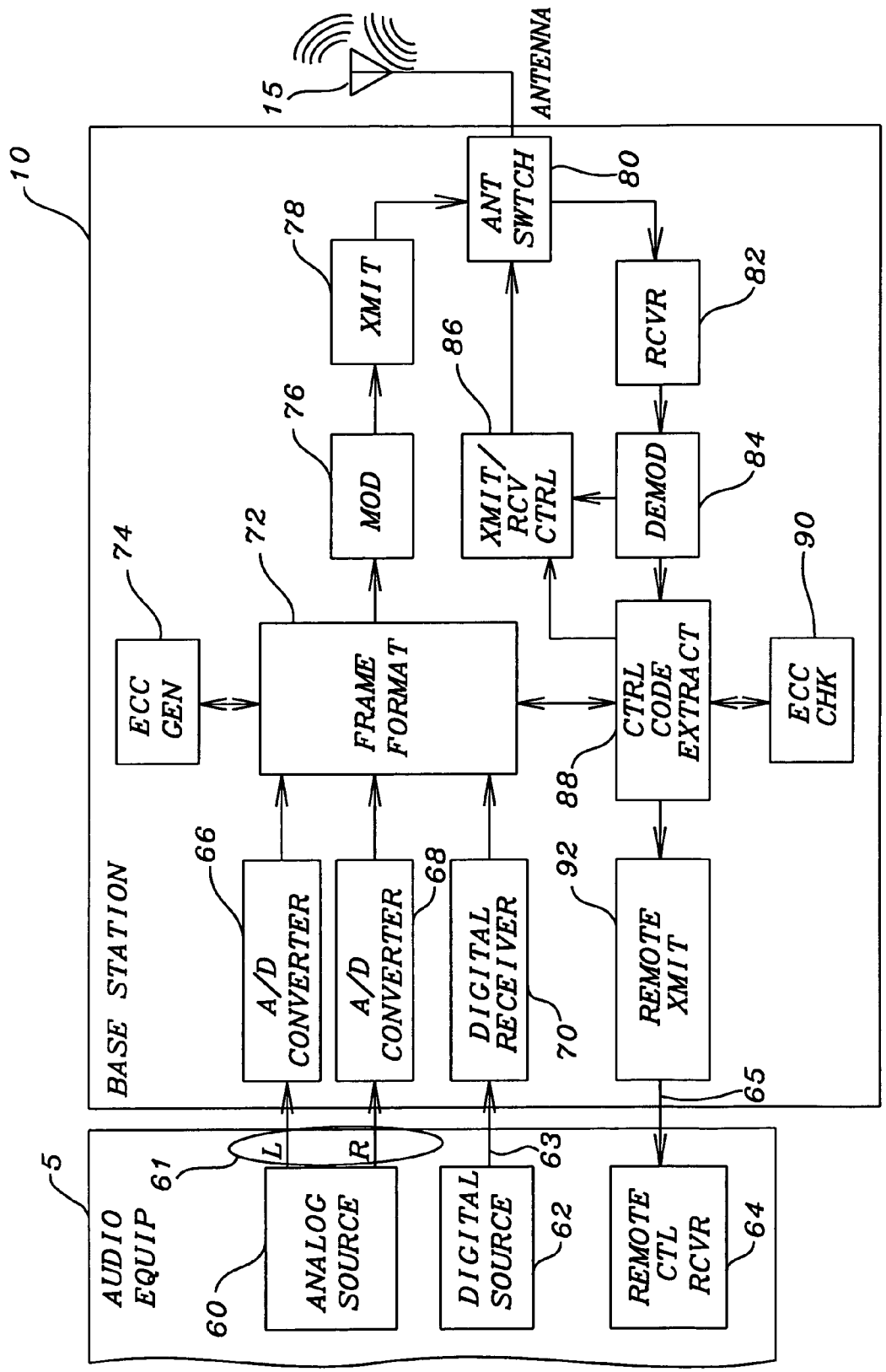
FIG. 3 is a function block diagram of the base station of the half-duplex wireless audio communication system of this invention.

The base station 10, as shown in FIG. 3, receives an analog signal 61 and/or a digitized audio signal 63 from the audio equipment 5. The analog signal, as shown, is a left and a right audio signal for stereo audio content from the analog source 60 and is applied to the analog-to-digital converters 66 and 68. The digital source supplies 62 the digitized audio signal 63 directly to the digital receiver 70. The digitized audio signal is applied to the frame format circuit 72 which forms the packets, frames, and blocks as described in FIG. 2*a*. The Error Correction Code generator 74 fashions the error detection and correction code that is appended to the frames of FIG. 2*a*. The formatted frames and blocks of the audio signal are conveyed to the modulator circuit 76 where the formatted audio signal modulates an RF signal. The modulated RF Signal is transferred to the transmitter 78 and through the antenna switch 80 to the antenna 15.

During the transmission, the antenna switch 80 is set to connect the transmitter 78 to the antenna. During reception, the antenna switch 80 is set to receive RF signals 20 from the antenna 15. The received RF signal 20 is transferred through the antenna switch 80 to the receiver 82. The receiver 82 amplifies and conditions the RF signal 20 and transfers the amplified and conditioned signal to the demodulator 84. The demodulator 84 extracts the control signals that are described in FIG. 2*a* from the RF signal and transfers the demodulated control signal to the control code extraction circuit 88. The control code extraction circuit 88 extracts the identification, timing, and control semaphores. The control code and the error detection and correction codes are conveyed to the error detection and correction circuit 90 to insure correctness of the received codes.

If the control signal is a ready-to-receive or request-to-send type communication, the control code extraction circuit 88 transfers the control signal to the transmit/receive control 86 for control of the antenna switch 80. If the control signal is one of the remote control codes, the control code extraction circuit 88 transfers the remote control code to the remote transmit unit 92. This then communicates the remote control code 65 to the remote control receiver 64 of the content retention and distribution system 5.

The remote transmit unit 92 may be a direct connection or may be equivalent to a universal remote control unit similar to that supplied with most entertainment equipment, having a infrared emitting diode to transmit the control signal which can be received by the IR remote sensor of the entertainment equipment.

The transmit/receive control circuit 86 will either operate in a synchronous manner providing the antenna switch with a command to change between transmitting and receiving in the synchronous manner described in FIG. 2 or will operate based on the "handshaking" protocols, also described in FIG. 2.

Figure 4:
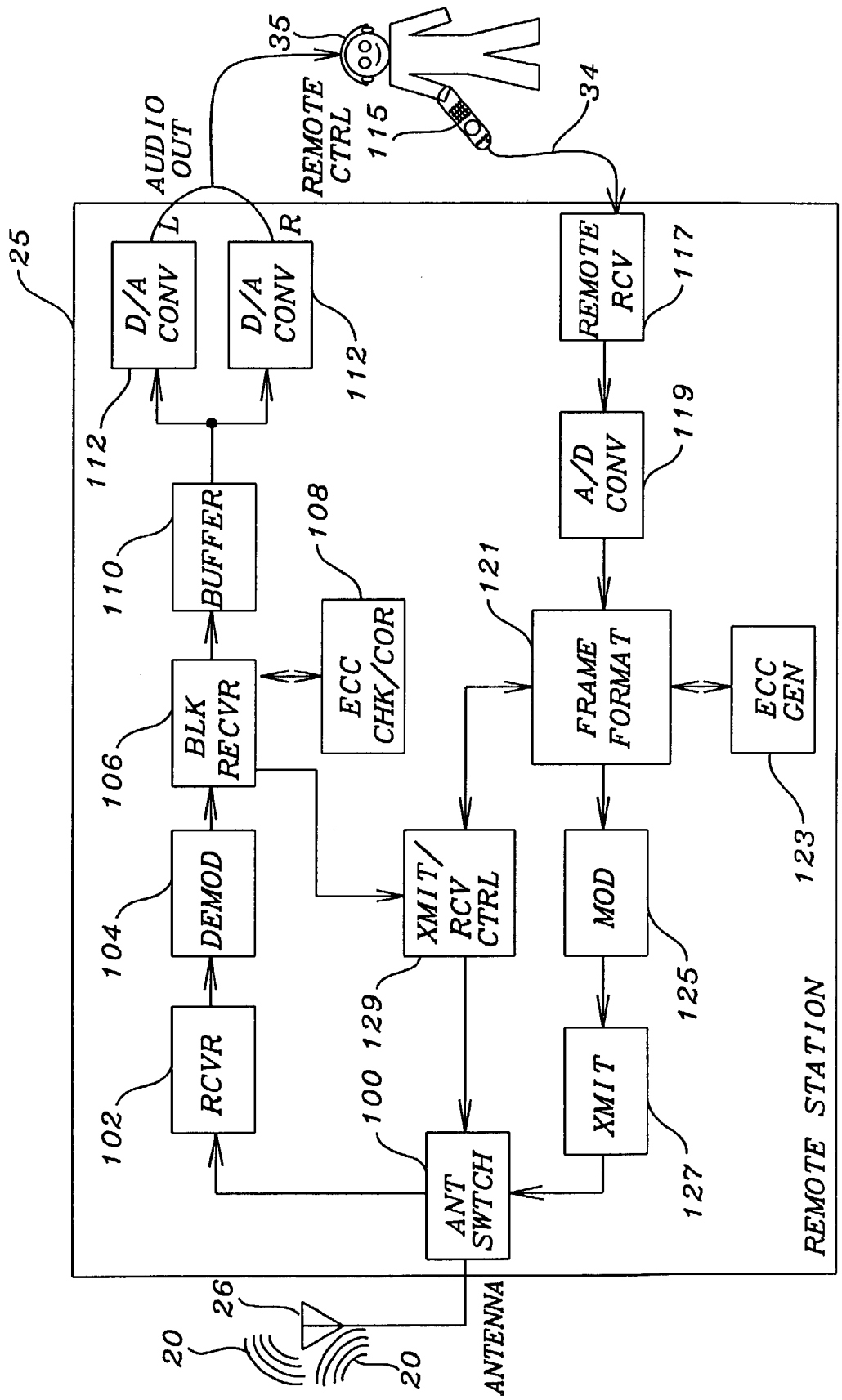
FIG. 4 is a function block diagram of the remote station of the half-duplex wireless audio communication system of this invention.

The transmitted RF signal 20 is acquired by the antenna 26 as shown in FIG. 4 and transferred through the antenna switch 100 to the remote station 25 to the receiver 102. The receiver amplifies and conditions the received RF signal 20 and transfers it to the demodulator 104. The demodulator 104 extracts the formatted digitized audio signal from the amplified and conditioned RF signal and conveys the formatted digitized audio signal to the block recovery circuit 106. The block recovery circuit extracts the digitized audio signals by detecting the timing, identification, and control signals embedded within the block as described in FIG. 2*a*. The error detection and correction codes are recovered and transferred with the digitized audio signals to the error checking and correction circuit 108. The error checking and correction circuit 108 detects and repairs any of the error that may occur to the digitized audio signal during transmission. When the block recovery circuit 106 encounters an end-of-block semaphore, the transmit and receive control circuit 129 is informed of the end-of-block. The corrected digitized audio signal is transferred to the buffer 110 where it is retained pending transmission to the digital-to-analog converters 112. The digital-to-analog converters translate the digitized audio signal to the analog audio signal 32, which is transferred to the headphones 35.

A remote control 115 is associated with the headphones 35 to provide the remote control signals 34 for controlling the content retention and distribution system. Alternately, the headphones may have an infrared sensor embedded to receive the signals of a remote control that is provided with the content and distribution system as opposed to a separate remote provided with the headphones. The remote control signals 34 are the input signals to the receiver circuit 117. If the remote control 115 is a physical switch and provides analog signals, these signals are converted to digitized signals in the analog-to-digitized converter 119. If the remote control signals 34 are already digitized, the analog-to-digital converter 119 is not included in the remote station. The digitized remote control signals are transferred to the frame format circuit 121.

The frame format circuit 121 creates the control block with the appended end-of-block as shown in FIG. 2*a*. The frame format circuit 121 transfers the control block to the error detection and correction code circuit 123 to generate the error correction code that is appended to the control code during the frame formatting. Further the control code is appended with timing, identification, and control semaphores to form the control block. The control block is transferred to the modulation circuit 125 where the control block is used to modulate the fundamental RF frequency signal. The modulated RF frequency signal is transferred to the transmitter 127. The transmitter 127 drives the RF frequency signal through the antenna switch 100 to the antenna 26.

If the synchronous protocol is employed in the communication system of this invention, then the transmit and receive control circuit 129 receives an end-of-block count signal from the block recovery circuit 106. The transmit and receive control circuit 129 is connected to the frame format circuit 121 to receive a signal indicating that a remote control signal is to be transmitted. The transmit and receive control circuit 129 then switches the antenna switch 100 such that the transmitter 127 is connected to the antenna 26 where there is a remote control command to be transmitted. If there is no remote control command to be transmitted, the transmit and receive control circuit 129 then keeps the antenna switch 100 connected to the receiver 102 to insure no transmission of any signal by the remote station 25.

Alternately, if a "handshaking" protocol is used, the block recovery circuit 106 detects the end-of-transmission or end-of-block signal and transfers this to the transmit and receive control circuit 129. If the frame format circuit 121 indicates that a remote control signal is present, the transmit and receive control circuit 129 sets the antenna switch 100 to connect the transmitter 127 to the antenna 26 and the remote control signal is transmitted. If no remote control signal is present, the frame format circuit 121 prepares a ready-to-receive signal for transmission.

If the error checking and correction circuit 108 determines that a frame or block of frames is not correctable, the block recovery circuit 106 informs the transmit and receive control circuit 129 of the error and details a block identification. This information is transferred to the frame format circuit 121, which prepares a command code requesting the resending of the block of the digitized audio signal. At the completion of the receipt of the current transmitted block, the command code requesting the resending of digitized audio signal is transmitted to the base station. The control code extraction circuit 88 of FIG. 3 determines the required block that is to be retransmitted and transfers the request to the frame format circuit 72. The frame format circuit 72 will include a buffer or memory circuit to retain previously transmitted blocks of the digitized audio signal. The block of the digitized audio signal is retrieved from the buffer of the frame format circuit 72 and transmitted according to the protocol employed.

The buffer 110 in the remote station 25 also insures the continuous transfer of the content signal to the content reproduction terminal even with signal corruption and re-transmission of blocks of the content signal.

Figure 5:
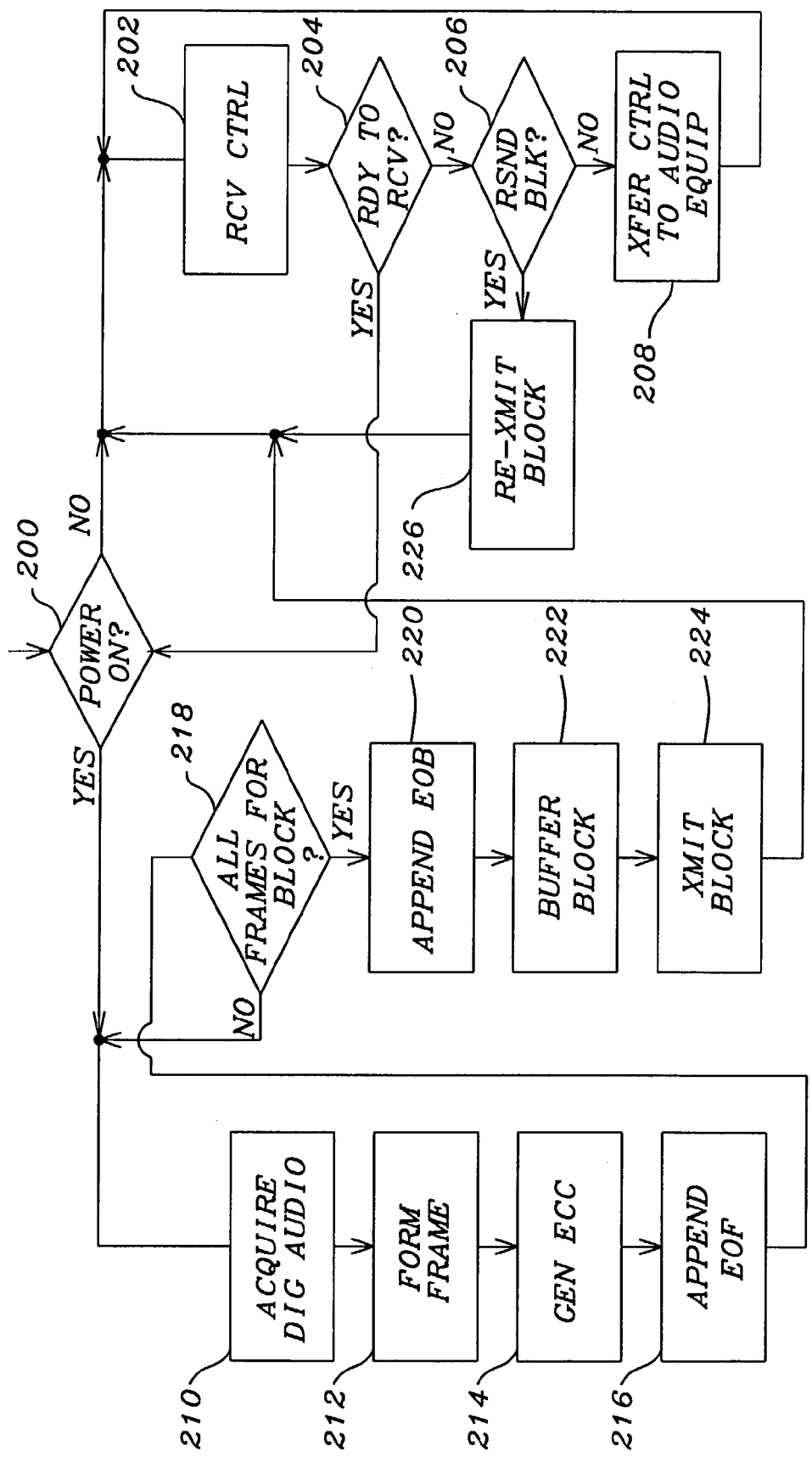
FIG. 5 is a flow chart that is a first embodiment of a method for the generation and transmission of the content signal and the reception of the control signal of a half-duplex wireless audio communication of this invention

Refer now to FIG. 5 for a description of a method of communication of content from and control signals to a base station for a wireless audio communication system. The method begins with the testing (Box 200) for activation of power of the content retention and distribution system. If the power is not activated, the transmitter is deactivated and the receiver is activated to receive a remote control message (Box 202). Any received message is tested (Box 204). If the message is a ready-to-receive message, the message indicates that the remote station is ready to receive the transmitted content. If the received remote control message is not a ready-to-receive message, the remote control message is tested (Box 206) and then it is determined whether a received block is in error and needs to be re-transmitted. If it is not a either the ready-to-receive message or the request for re-transmission message, the remote control message is intended to control the content retention and distribution system. Initially, this will to activate the power of the content retention and distribution system.

The receiver of the base station is activated and the next remote control message is received (Box 202). If the signal is the ready-to-receive message a power indication is then checked (Box 200) indicating that the content retention and distribution system is activated. If the system has been activated, the digitized audio is acquired (Box 210). If the content retention and distribution system is providing an analog audio signal, this signal is digitized upon acquisition (Box 210). The frame is formed (Box 212) as described for FIGS. 2a or 2b. An error detection and correction code is generated (Box 214) and appended to the frame. The synchronization code and an end-of-frame semaphore is appended (Box 216) to the frame. A frame counter is incremented and the counter is tested (Box 218) to determine if all the frames necessary to construct the block are assembled. If all the blocks are not assembled, the packets of the digitized audio signal are acquired (Box 210), a frame is formed (Box 212), an error detection and correction code is generated (Box 214), and the end-of-frame appended (Box 216) until the total number of frames for each block is assembled. Once the block is assembled, an end-of-block semaphore is appended (Box 220) to the block indicating the boundary of the block. It should be noted that if multiple blocks are to be transmitted during a single transmission, the total number of blocks are assembled as described. Further, if there are to be a variable number of blocks transmitted at a given time, then one of the control messages within the end-of-block semaphores would be an indication of the number of blocks to be transmitted and optionally a position identifier for each block within the group of blocks.

The block or group of blocks is transferred to and retained (Box 222) within a buffer or memory unit before being transmitted (Box 224). Further, the end-of-block semaphore will contain a ready-to-receive command indicating that the base station will switch from transmitting to receiving. The receiver then receives (Box 202) the next control message. If there are no remote control signals and the control message is the ready-to-receive semaphore, the next block is assembled as described above and transmitted. However, if the remote control message is not a ready-to-receive message but a request for a resending of a block, the block to be resent is identified, and then retrieved from the buffer for re-transmission (Box 226). The next remote control message is received (Box 202) and the process continues as described.

Figure 6:
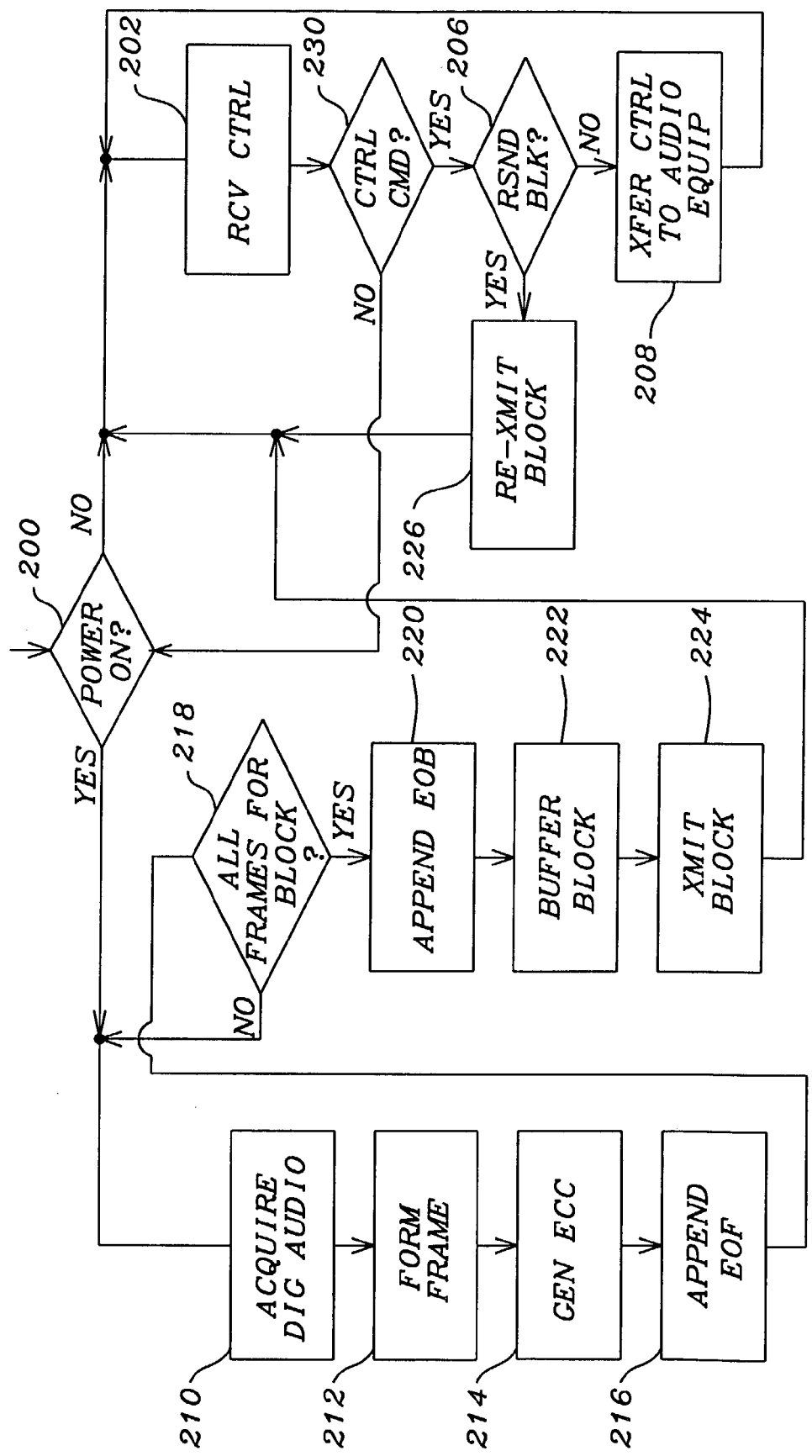
FIG. 6 is a flow chart that is a second embodiment of a method for the generation and transmission of the content signal and the reception of the control signal of a half-duplex wireless audio communication of this invention

The method of FIG. 5 describes the process for communication by a base station where the protocol has a "handshaking" semaphore informing the base station that either the remote station is ready to receive or the base station is ready to receive. Further, there is the option of having variable length messaging, such that the blocks of digitized audio signals may be of differing numbers. In FIG. 6, a more synchronous flow is explored. The number of blocks is assumed to be fixed and the duration of the transmission of the blocks is constant. The assembly of the blocks and the reception of the remote control messages is equivalent to that described in FIG. 5. However, there is no transmission of a ready-to-receive message from either the base station or the remote station. The receiver acquires (Box 202) the remote control signal and the remote control signal is tested (Box 230) to determine whether or not the signal is valid. Since the remote station is not transmitting during the remote control message time of FIG. 2b, there will be no remote control signal. If the power for the content retention and distribution system is active, the next block or set of blocks is assembled and transmitted. If there is a remote control message, the message is tested (Box 206). If it is a request to resend the block of digitized audio signals, the designated block or the previous block is resent (Box 226). If the remote control message is a remote control code for the content retention is and distribution system, the remote control code is transmitted (Box 208) to the content retention and distribution system.

Figure 7:
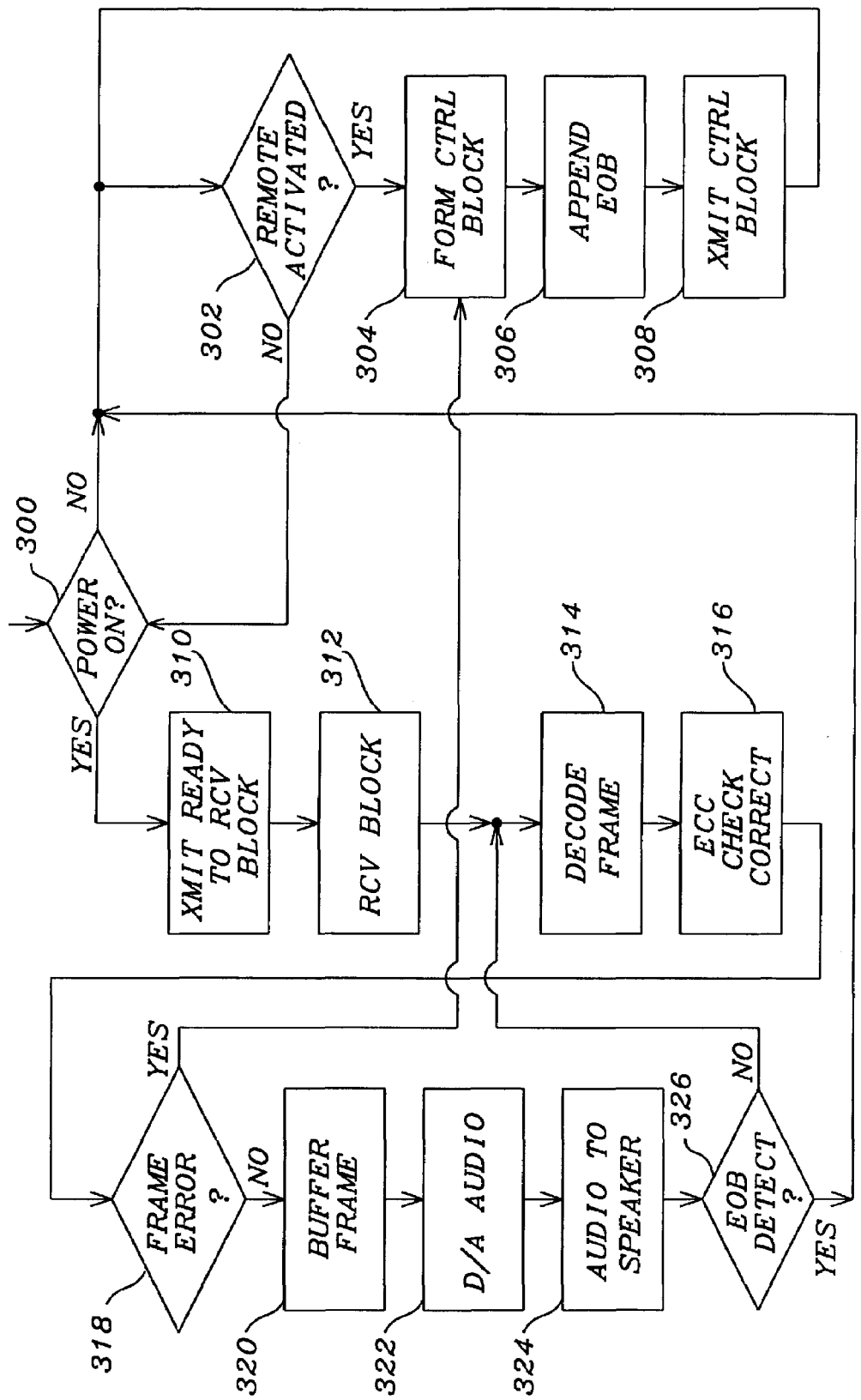
FIG. 7 is a flow chart that is a first embodiment of a method for the reception of the content signal and the generation and transmission of the control signal of a half-duplex wireless audio communication of this invention

The method for the operation of the remote station of this invention is shown in FIG. 7. The power indication is tested (Box 300) to determine if the power is activated for the content retention and distribution system. If the power is not activated, the remote control input device is tested (Box 302) for activation. If it is not activated the method tests (Box 300) for the activation of the power until the remote control input device is activated. The remote control command is formed as a remote control block with an error detection and correction code. An end-of-block semaphore is appended (Box 306) to the remote control block and the remote control message is transmitted to the base station. When the remote control input device is deactivated and the power of the content retention and distribution system is activated, the remote station transmits (Box 310) a ready-to-receive semaphore as a remote control message. The base station transmits the block or blocks of digitized audio signals that have been received (Box 312) by the remote station. As each frame of the block is decoded (Box 314), it has an error detection and correction performed on it (Box 316) by the embedded error detection and correction code appended within the frame. The frame is tested (Box 318) for the existence of an uncorrectable error. If there is no uncorrectable error, the frame is then placed in a buffer or memory and the packet of digitized audio signal within the frame as described in FIG. 2*a* is converted (Box 322) to an analog signal. The analog audio signal is then transmitted (Box 324) to the headphones or speakers. Each frame of the block is received and decoded until an end-of-block semaphore is detected (Box 326). The remote control input device is then tested for the activation to indicate a remote control command is ready to be transmitted. If there is no remote control command, the ready-to-receive control block is transmitted (Box 310) to the base station.

If the test for a frame error (Box 318) indicates an occurrence of an error within the frame or block of the digitized audio signals, a remote control block indicating a request-to-resend the block having the error is formed (Box 304), its end-of-block semaphore is appended (Box 306), and the block is transmitted to the base station. The base station re-transmits the block or blocks of the digitized audio signal. The block is received (Box 312); each frame is decoded (Box 314); checked for errors (Box 316); and now it is, presumably, error free. The re-transmitted block or blocks are placed (Box 320) in the buffer and merged with previously transmitted blocks and then converted (Box 322) to the analog audio signal for transmission (Box 324) to the headphones or speakers.

Figure 8:
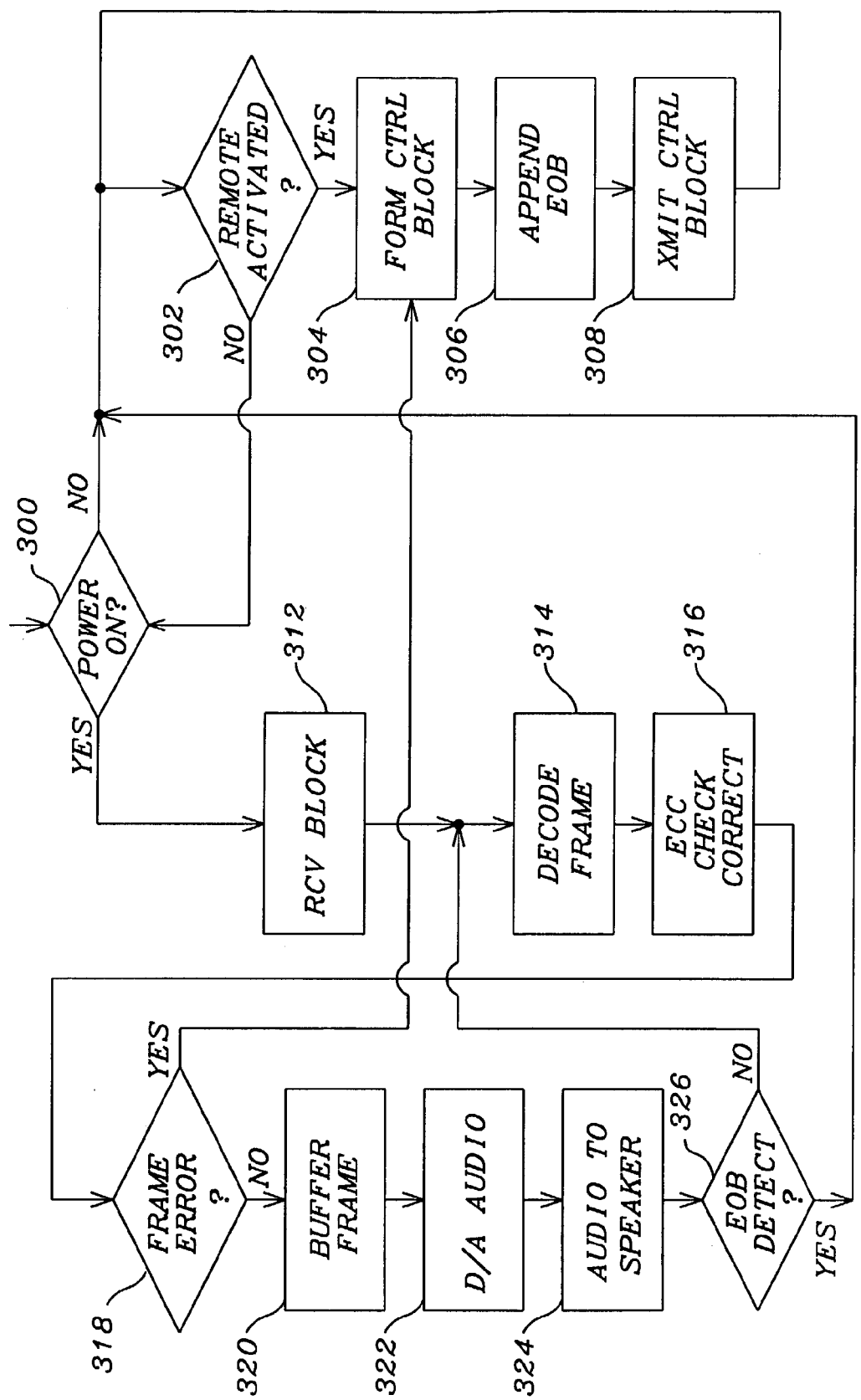
FIG. 8 is a flow chart that is a second embodiment of a method for the reception of the content signal and the generation and transmission of the control signal of a half-duplex wireless audio communication of this invention

The method of FIG. 7 is for a "handshaking" protocol where the ready-to-receive control message is transmitted (Box 310) to indicate that the remote station has activated its receiver to receive the modulated RF signal. Alternately, in FIG. 8, no ready-to-receive semaphore is transmitted and the end-of-block is detected as the completion of the duration of the transmission of the block or group of blocks of the digitized audio signals. The remote control signals, if any, are formed (Box 304 and 306) and transmitted (Box 308). If there are no remote control signals to be transmitted (Box 308), the remote station transmitter is deactivated for the duration of the remote control message time as shown in FIG. 2*b*.

While this invention has been particularly shown and described with reference to the preferred embodiments thereof, it will be understood by those skilled in the art that various changes in form and details may be made without departing from the spirit and scope of the invention.

The invention claimed is:

1. A wireless communication system connected between a content retention and distribution system and a remote content reproduction terminal to transmit a content signal from said content retention and distribution system to said content reproduction terminal and to transmit control signals from said content reproduction terminal to said content retention and distribution system over a half-duplex channel, said wireless communication system comprising:
   a base station in communication with the content retention and distribution system to receive a fundamental content signal, partitions said fundamental content signal into signal segments, append timing, identification, and control messages to said signal segments to form the content signal, and to transmit said content signal over said half-duplex channel; and
   a remote station to receive the transmitted content signal, to remove the timing, identification, and control signals from said content signal to reassemble the fundamental content signal, said remote station in communication with the content reproduction terminal to transfer the reassembled content signal to said content reproduction terminal, and to receive control signals from the content reproduction terminal, append timing and identification messages to said control signal to form a control message that is transmitted to said base station over said half-duplex channel;
   wherein the base station removes the timing and identification messages and transfers the control signals to the content retention and distribution system to provide remote control functions for the content retention and distribution system.

2. The wireless communication system of claim 1 wherein the control message contains an end-of-transmission semaphore indicating that said fundamental content signal is completed and said base station is ready to receive a transmission from said remote station.

3. The wireless communication system of claim 1 wherein said control signal is an acknowledgment of receipt of said transmitted content signals and a ready-to-receive semaphore.

4. The wireless communication system of claim 1 wherein said control message contains a request to re-transmit at least one portion of said content signal.

5. The wireless communication system of claim 1 wherein the control signals include power-on, volume increase, volume decrease, presentation selection, pause presentation, fast-forward presentation, and re-wind presentation.

6. The wireless communication system of claim 1 wherein the content signal has a first predetermined duration and at the completion of said first predetermined duration the control message is transmitted from said remote station for a second predetermined duration, whereby transmission of the control message is synchronized with the transmission of the content signal.

7. The wireless communication system of claim 1 wherein the base station generates a content error correction code for said fundamental content signal and appends said content error correction code to said fundamental content signal in the formation of the content signal.

8. The wireless communication system of claim 7 wherein the remote station examines said content error correction code to detect and correct corruption of said content signal.

9. The wireless communication system of claim 1 wherein said remote station generates a control error correction code for said control signal and appends said control error correction code to said control signal in the formation of the control message.

10. The wireless communication system of claim 9 wherein said base station examines said control error correction code to detect and correct corruption of said control message.

11. The wireless communication system of claim 1 wherein the half-duplex channel is selected from the half-duplex channels consisting of an RF channel having a the same frequency band, an infrared light channel, an ultrasonic channel, and a wired serial communication link.

12. The wireless communication system of claim 1 wherein the content signal is an analog signal and said base station converts said analog signal to a digital signal for transmission and said remote station converts said digital signal to a replication of said content signal for reproduction on said content reproduction terminal.

13. The wireless communication system of claim 1 wherein said content signal is a digitized audio signal.

14. The wireless communication system of claim 1 wherein the remote station includes a buffer memory to retain said content signal to insure continuous transfer of said content signal to said content reproduction terminal even with corruption and re-transmission of portions of said content signal.

15. A method for the wireless communication between a content retention and distribution system and a remote content reproduction terminal to transmit a content signal from said content retention and distribution system to said content reproduction terminal and to transmit control signals from said content reproduction terminal to said content retention and distribution system over a half-duplex channel, said method for wireless communication comprising the steps of:
receiving a fundamental content signal;
partitioning said fundamental content signal into signal segments;
appending timing, identification, and control records to said signal segments to form the content signal; and
transmitting said content signal upon said half duplex channel;
upon completion of the transmission of said content signal, receiving the transmitted content signal;
removing the timing, identification, and control signals from said content signal to reassemble the fundamental content signal;
transferring the reassembled content signal to said content reproduction terminal;
receiving control signals from the content reproduction terminal;
appending timing and identification messages to said control signal to form a control message;
transmitting said control message to said content retention and distribution system over said half-duplex channel;
receiving by said base content retention and distribution system the control message;
removing the timing and identification messages from the control message; and
transferring the control signals to the content retention and distribution system to provide remote control functions for the content retention and distribution system.

16. The method for wireless communication of claim 15 wherein the control records contains an end-of-transmission semaphore indicating that said fundamental content signal is completed and said content retention and distribution system is ready to receive a transmission from said remote content reproduction terminal.

17. The method for wireless communication of claim 15 wherein said control signal is an acknowledgment of receipt of said transmitted content signals and a ready-to-receive semaphore.

18. The method for wireless communication of claim 15 wherein the content signal has a first predetermined duration and at the completion of said first predetermined duration the control message is transmitted from said remote content reproduction terminal for a second predetermined duration, whereby transmission of the control message is synchronized with the transmission of the content signal.

19. The method for wireless communication of claim 15 wherein the control signals include power-on, volume increase, volume decrease, presentation selection, pause presentation, fast-forward presentation, and re-wind presentation.

20. The method for wireless communication of claim 15 further comprising the steps of:
generating a content error correction code for said fundamental content signal; and
appending said content error correction code to said fundamental content signal in the formation of the content signal.

21. The method for wireless communication of claim 20 further comprising the step of examining said content error correction code to detect and correct corruption of said content signal.

22. The method for wireless communication of claim 21 further comprising the steps of:
if said corruption of said content signal is not correctable, generating said control message containing a request to re-transmit at least one portion of said content signal; and
upon receipt of said request to re-transmit, re-transmitting said portion of said content signal.

23. The method for wireless communication of claim 15 further comprising the steps of:
generating a control error correction code for said control signal; and
appending said control error correction code to said control signal in the formation of the control message.

24. The method for wireless communication of claim 23 further comprising the step of examining said control error correction code to detect and correct corruption of said control message.

25. The method for wireless communication of claim 15 wherein the half-duplex channel is selected from the half-duplex channels consisting of an RF channel having the same frequency band, an infrared light channel having a single wavelength, an ultrasonic channel having a single ultrasonic frequency, and a wired serial communication link.

26. The method for wireless communication of claim 15 wherein the content signal is an analog signal and said method comprises the steps of:
converting said analog signal to a digital signal for transmission; and
upon reception of said digital content signal, converting said digital signal to a replication of said content signal for reproduction on said content reproduction terminal.

27. The method for wireless communication of claim 15 wherein said content signal is a digitized audio signal.

28. The method for wireless communication of claim 15 further comprising the step of buffering said content signal within a memory to retain said content signal to insure continuous transfer of said content signal to said content reproduction terminal even with corruption and re-transmission of portions of said content signal.

29. Apparatus for the wireless communication between a content retention and distribution system and a remote content reproduction terminal to transmit a content signal from said content retention and distribution system to said content reproduction terminal and to transmit control signals from said content reproduction terminal to said content retention and distribution system over a half-duplex channel, said apparatus for wireless communication comprising:
means for receiving a fundamental content signal;
means for partitioning said fundamental content signal into signal segments;
means for appending timing, identification, and control records to said signal segments to form the content signal; and
means for transmitting said content signal upon said half duplex channel;
means for receiving the transmitted content signal upon completion of the transmission of said content signal;

means for removing the timing, identification, and control signals from said content signal to reassemble the fundamental content signal;

means for transferring the reassembled content signal to said content reproduction terminal;

means for receiving control signals from the content reproduction terminal;

means for appending timing and identification messages to said control signal to form a control message;

means for transmitting said control message to said content retention and distribution system over said half-duplex channel;

means for receiving by said content retention and distribution system the control message;

means for removing the timing and identification messages from the control message; and means for transferring the control signals to the content retention and distribution system to provide remote control functions for the content retention and distribution system.

30. The apparatus for wireless communication of claim 29 wherein the control records contains an end-of-transmission semaphore indicating that said fundamental content signal is completed and said content retention and distribution system is ready to receive a transmission from said remote content reproduction terminal.

31. The apparatus for wireless communication of claim 29 wherein said control signal is an acknowledgment of receipt of said transmitted content signals and a ready-to-receive semaphore.

32. The apparatus for wireless communication of claim 29 wherein the content signal has a first predetermined duration and at the completion of said first predetermined duration the control message is transmitted from said remote content reproduction terminal for a second predetermined duration, whereby transmission of the control message is synchronized with the transmission of the content signal.

33. The apparatus for wireless communication of claim 29 wherein the control signals include power-on, volume increase, volume decrease, presentation selection, pause presentation, fast-forward presentation, and re-wind presentation.

34. The apparatus for wireless communication of claim 29 further comprising:

means for generating a content error correction code for said fundamental content signal; and means for appending said content error correction code to said fundamental content signal in the formation of the content signal.

35. The apparatus for wireless communication of claim 34 further comprising means for examining said content error correction code to detect and correct corruption of said content signal.

36. The apparatus for wireless communication of claim 35 further comprising:

means for generating said control message containing a request to re-transmit at least one portion of said content signal if said corruption of said content signal is not correctable; and means for re-transmitting said portion of said content signal upon receipt of said request to re-transmit.

37. The apparatus for wireless communication of claim 29 further comprising means for generating a control error correction code for said control signal and means for appending said control error correction code to said control signal in the formation of the control message.

38. The apparatus for wireless communication of claim 37 further comprising means for examining said control error correction code to detect and correct corruption of said control message.

39. The apparatus for wireless communication of claim 29 wherein the half-duplex channel is selected from the half-duplex channels consisting of an RF channel having the same frequency band, an infrared light channel having a single wavelength, an ultrasonic channel having a single ultrasonic frequency, and a wired serial communication link.

40. The apparatus for wireless communication of claim 29 wherein the content signal is an analog signal and said apparatus comprises:

means for converting said analog signal to a digital signal for transmission; and means for converting said digital signal to a replication of said content signal for reproduction on said content reproduction terminal upon reception of said digital content signal.

41. The apparatus for wireless communication of claim 29 wherein said content signal is a digitized audio signal.

42. The apparatus for wireless communication of claim 29 further comprising means for buffering said content signal within a memory to retain said content signal to insure continuous transfer of said content signal to said content reproduction terminal even with corruption and re-transmission of portions of said content signal.

* * * * *

UNITED STATES PATENT AND TRADEMARK OFFICE
CERTIFICATE OF CORRECTION

PATENT NO. : 7,046,999 B2 Page 1 of 1
APPLICATION NO. : 10/449993
DATED : May 16, 2006
INVENTOR(S) : Wu et al.

It is certified that error appears in the above-identified patent and that said Letters Patent is hereby corrected as shown below:

On the Title page, in Item (75), delete "Ka Ming Wu, Chai Wan (HK); Yan Kwan So, Causeway Bay (HK)" and replace with - - Ka Ming Wu, Hong Kong, (HK); Yan Kwan So, Hong Kong, (HK) - -.

Signed and Sealed this

First Day of August, 2006

JON W. DUDAS
*Director of the United States Patent and Trademark Office*